(12) United States Patent
Tajima et al.

(10) Patent No.: US 6,924,580 B2
(45) Date of Patent: Aug. 2, 2005

(54) VEHICLE ALTERNATOR AND ITS ROTOR

(75) Inventors: Susumu Tajima, Hitachinaka (JP);
Shinji Yamazaki, Hitachinaka (JP);
Wasei Horioka, Hitachinaka (JP);
Masahiko Honma, Kanasagou (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/420,883

(22) Filed: Apr. 23, 2003

(65) Prior Publication Data
US 2004/0178696 A1 Sep. 16, 2004

(30) Foreign Application Priority Data

Apr. 26, 2002 (JP) ........................................ 2002-125189
Mar. 12, 2003 (JP) ........................................ 2003-65873

(51) Int. Cl.$^7$ .............................. H02K 1/22; H02K 9/00
(52) U.S. Cl. .............. 310/263; 310/156.66; 310/156.72
(58) Field of Search ........................... 310/263, 156.66, 310/156.67, 156.68, 156.69, 156.71, 156.72, 156.73, 261; 29/596–598

(56) References Cited

U.S. PATENT DOCUMENTS

| | | | | | |
|---|---|---|---|---|---|
| 5,483,116 A | * | 1/1996 | Kusase et al. | ............... | 310/263 |
| 5,793,144 A | * | 8/1998 | Kusase et al. | ............... | 310/263 |
| 5,925,964 A | * | 7/1999 | Kusase et al. | ............... | 310/263 |

FOREIGN PATENT DOCUMENTS

| | | |
|---|---|---|
| JP | 07-298585 | 11/1995 |
| JP | 2783264 | 5/1998 |
| JP | 2865092 | 12/1998 |
| JP | 11-98787 | 4/1999 |
| JP | 3144567 | 1/2001 |

* cited by examiner

Primary Examiner—Darren Schuberg
Assistant Examiner—Leda Pham
(74) Attorney, Agent, or Firm—Crowell & Moring LLP

(57) ABSTRACT

The rotor of a vehicle alternator can firmly fasten the permanent magnets between claw-shaped magnetic poles. The rotor includes a Lundell type iron core having claw-shaped magnetic poles which are alternately arranged and opposed each other and include a centered cylindrical field winding, and a permanent magnet disposed between the claw-shaped magnetic poles for increasing the magnetic field. The permanent magnet is held by radial elastic force.

18 Claims, 5 Drawing Sheets

VEHICLE ALTERNATOR AND ITS ROTOR

BACKGROUND OF THE INVENTION

1. Field of the Invention

The present invention relates to a rotor for a vehicle alternator, more particularly to the holding and fastening of permanent magnets arranged between claw-shaped magnetic poles of a Lundell type rotor.

2. Prior Art

It is well known to increase the exciting force of an alternator having a rotor with Lundell type claw-shaped magnetic poles by separately disposing permanent magnets between the opposing claw-shaped magnetic poles. Exemplary examples are described in Japanese Application Patent Laid-Open Publication No. Hei 07-298585 and Japanese Application Patent Laid-Open Publication No. Hei 11-98787. The former describes permanent magnets bonded by an adhesive to the permanent magnet catching portions on the internal sides of flange protrusions and to the sides of claw-shaped magnetic poles. The latter describes protect covers of nonmagnetic stainless steel outside the permanent magnets against the quick rotation of the rotor.

SUMMARY OF THE INVENTION

Problems to be Solved by the Invention

Conventionally, the permanent magnets need to be fastened after they are positioned between the claws. The magnets after they are magnetized are hard to handle so that, for easy mounting and less damage during the mounting, the magnets are generally mounted on the rotor before they are magnetized. Particularly, when the magnets after they are magnetized are mounted on the rotor, subsequent machining of the rotor to adjust the rotor outer diameter or to balance the rotation needs to remove machining chips attached on the magnets, which reduces the workability significantly.

When the magnets before they are magnetized are mounted on the rotor, the magnets have no adhesion to the magnetic poles, so that a special tool is necessary to position the magnets with a certain space with the field winding, which reduces the productivity. An adhesive only fastens the magnets on the rotor so that any space can easily occur in the join with the claw-shaped magnetic poles, thereby increasing the magnetic flux loss to cause the output reduction.

The conventional techniques have another problem that the permanent magnets disposed between the claw-shaped magnetic poles make it hard to apply around the axial center of the field winding the adhesive for fastening and isolating the field winding.

Means for Solving the Problems

The present invention provides a vehicle alternator and its rotor which can firmly fasten the permanent magnets between the claw-shaped magnetic poles in improved productivity. The present invention also provides a vehicle alternator and its rotor having permanent magnets between the claw-shaped magnetic poles, which can reliably apply around the axial center of the permanent magnets the adhesive for isolating the field winding.

The above rotor for a vehicle alternator can be achieved by a Lundell type iron core having claw-shaped magnetic poles which are alternately arranged and opposed each other and include a centered cylindrical field winding; and a permanent magnet disposed between the claw-shaped magnetic poles for increasing the magnetic field, wherein the permanent magnet is held by radial elastic force. The above vehicle alternator can be achieved by a stator; and a rotor being rotatively disposed opposing the stator with a gap therebetween and having a permanent magnet held by radial elastic force.

In the above vehicle alternator and its rotor, the permanent magnet is encircled in a holder and pressed and held by an elastic body disposed between the holder and the field winding for exerting radial elastic force.

The holder may be made of a metal strip and integrated with the elastic body. The elastic body is in contact with the field winding via an insulating member. The holder may encircle the permanent magnet longitudinally and have a tongue-like piece of an elastic portion on its surface facing the field winding. The tongue-like piece is a cutout of the holder and has an arc shape being convex toward the field winding. The elastic portion is in contact with an insulating material wound on the field winding. The insulating material is a fabric suitable for dropped adhesives. The holder may include a loop strip which encircles the permanent magnet longitudinally, the starting end at one longitudinal end of the strip having a protrusion extending beyond the permanent magnet width, the finishing end of the strip connecting to the starting end, and the protrusion stopping at one end of a field winding bobbin.

DETAILED DESCRIPTION OF THE INVENTION

Description of the Preferred Embodiments

Figure 1:
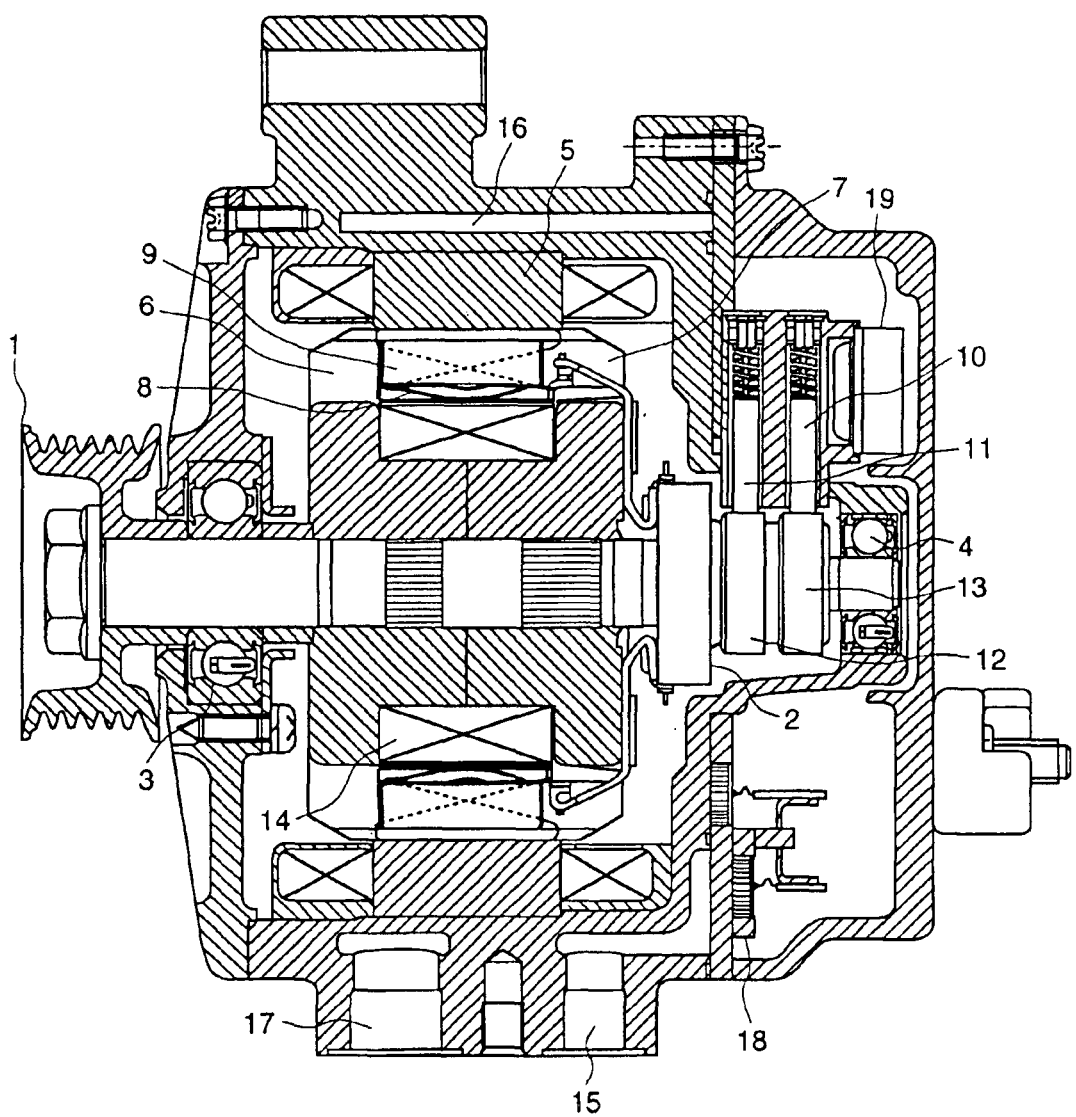
FIG. 1 shows an example of an alternator according to the present invention.

FIG. 1 shows a cross sectional view of an example of the present invention. A pulley 1 receives a driving force from the vehicle via a belt (not shown). Then a rotor 2 held by bearings 3, 4 rotates inside a stator 5. The rotor 2 has a holder 8 and a permanent magnet 9 between claws of a pair of claw-shaped magnetic poles 6, 7 including a plurality of claws. The rotor 2 has slip rings 12, 13 which receive electric power from brushes 10, 11 and excite a field winding 14 in the rotor 2.

The vehicle alternator receives a coolant from the internal combustion engine through a coolant inlet 15. The coolant circulates through passages such as a passage 16 in the vehicle alternator to cool heated components such as the stator 5 and rectifier 18 when the vehicle alternator generates electric power. After cooling, the coolant returns to the internal combustion engine through the coolant outlet 17. The coolant is then cooled in a radiator of the internal combustion engine and recycled. A voltage regulator 19 regulates the generated voltage. A terminal 20 connects to the rectifier 18 (this connection is not shown) and electrically connects the vehicle wiring and the vehicle alternator to supply the rectified output current to the vehicle.

Figure 2:
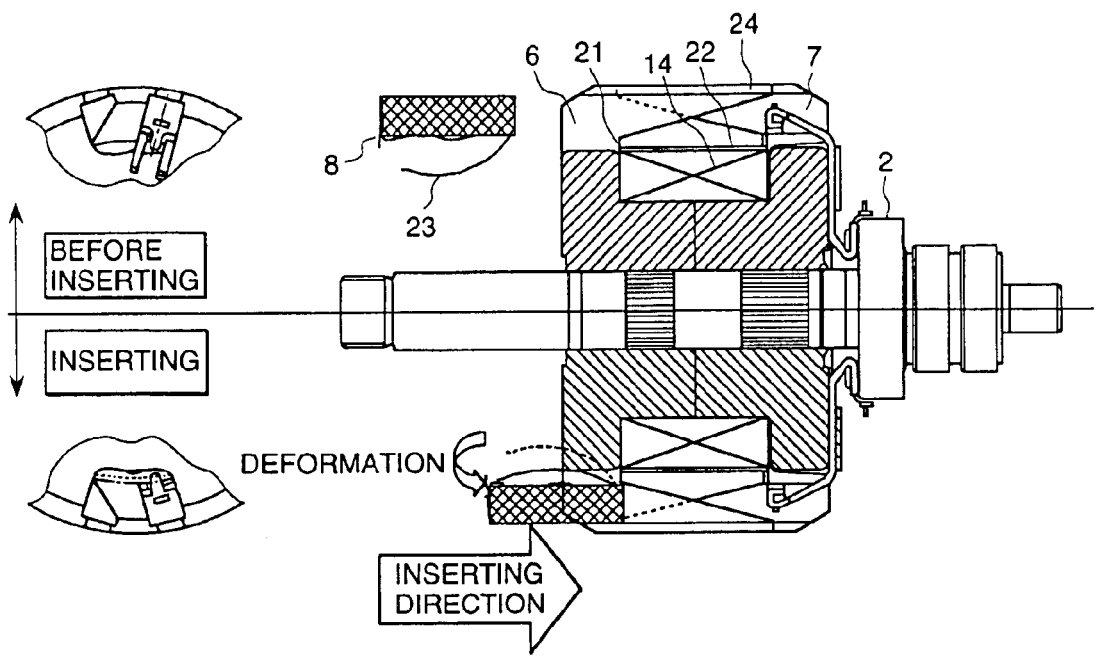
FIG. 2 shows an example of a rotor according to the present invention.

FIG. 2 only shows the rotor 2. The upper part of FIG. 2 shows the assembled rotor and the permanent magnet in the holder before inserted into the claw-shaped magnetic poles. The lower part of FIG. 2 shows the holder and the permanent magnet being inserted and fastened in a predetermined position in the rotor. The field winding 14 winds around a bobbin 21 which can isolate the field winding 14 from the claw-shaped magnetic poles 6, 7. An insulator 22 is provided on the outermost part of the wires of the field winding 14. The insulator 22 can keep a tongue-like piece 23 of an elastic portion of the holder 8 from directly contacting with the wires of the field winding 14. The tongue-like piece 23 is provided on a holder 8's surface which faces the field winding 14 when the holder 8 is in position. The insulator 22 may be unnecessary if the holder 8 is made of insulating materials, such as plastic and rubber, which will not damage the insulating film on the wires of the field winding 14 or cause the insulation failure, when the holder 8 is inserted into the claw-shaped magnetic poles along the rotation axis of the rotor. In contrast, the insulator 22 is essential if the holder 8 is made of metals such as spring steel and stainless steel.

When the holder 8 and the permanent magnet 9 shown in the upper part of FIG. 2 are moved in the direction of the arrow and inserted between the claw-shaped magnetic poles 6, 7, the springy portion 23 of the holder 8 will become deformed and have a spring effect on the claw-shaped magnetic poles 6, 7 and outermost insulator 22 of the field winding 14. Thus, the holder 8 can come into close contact with the internal sides of protrusions 24 of the claw-shaped magnetic poles 6, 7 and can secure the radial position of the permanent magnet 9. The protrusions 24 can keep the holder 8 and permanent magnet 9 on the sides of the claws of the claw-shaped magnetic poles 6, 7 from jumping out radially from between the claw-shaped magnetic poles 6, 7 by the centrifugal force due to the rotation of the rotor 2.

Figure 3:
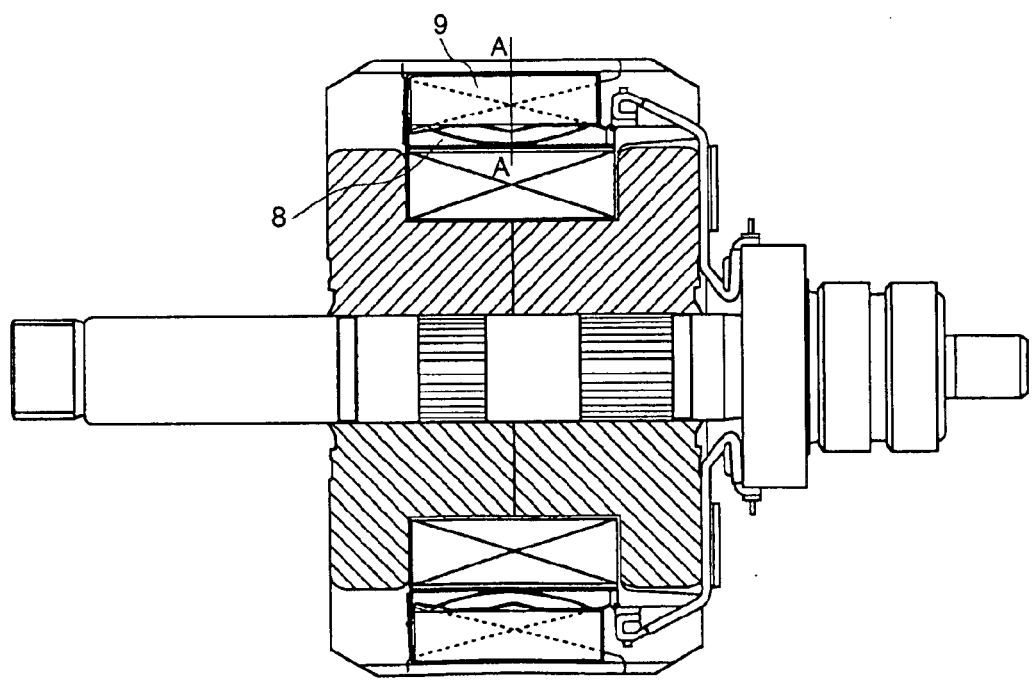
FIG. 3 shows another example of a rotor according to the present invention.
Figure 4:
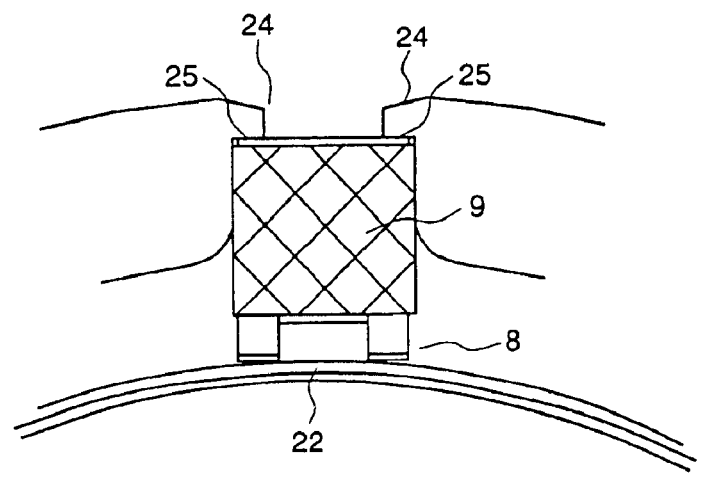
FIG. 4 shows a cross sectional view along the line A—A of FIG. 3.

FIG. 3 shows the holder 8 and permanent magnet 9 held in position in the rotor 2. FIG. 4 shows a cross sectional view along the line A—A of FIG. 3. As shown in FIGS. 3 and 4, when the tongue-like piece 23 of the elastic portion of the holder 8 is deformed, the holder 8 can come into close contact with the internal surfaces 25 of the protrusions 24 provided on the sides of the claw-shaped magnetic poles 6, 7. As mentioned above, the tongue-like piece 23 is provided on the holder 8's surface which faces the field winding 14 when the holder 8 is in position. The protrusions 24 can keep the holder 8 and permanent magnet 9 from jumping out radially from a predetermined position by the centrifugal force due to the rotation of the rotor 2.

The insulator 22 can be any insulating material if it is only intended to isolate the field winding 14 from the tongue-like piece 23 of the elastic portion of the holder 8 holding the permanent magnet 9. However, for isolation and adhesion between the wires of the field winding 14, between the field winding 14 and the bobbin 21, and between the bobbin 21 and the claw-shaped magnetic poles 6, 7, the insulator 22 must be materials which can infiltrate an adhesive into between the above described components.

Particularly, if a liquid adhesive is dropped on the rotor 2 in the manufacturing process, the holder 8 and permanent magnet 9 between the claw-shaped magnetic poles may prevent applying the adhesive around the axial center of the field winding 14.

Figure 5:
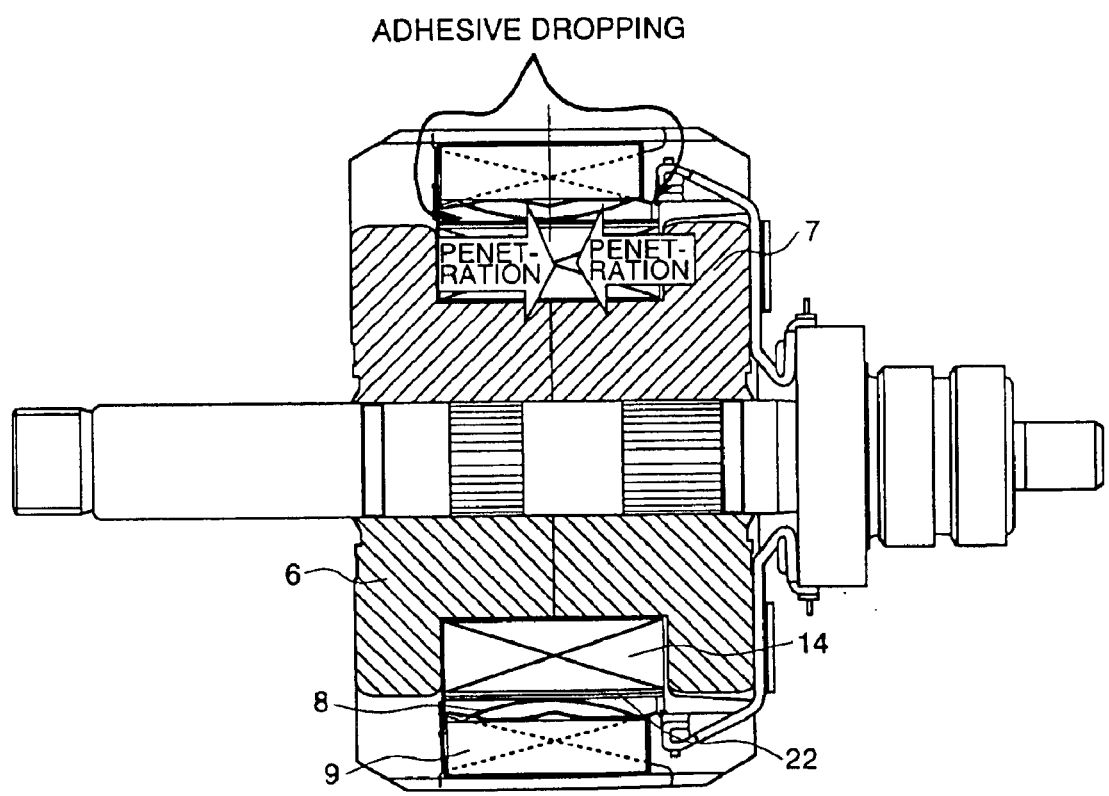
FIG. 5 shows an illustration of liquid adhesives dropped on the rotor of FIG. 2.

To solve the above problem, the insulator 22 can be made of materials which can infiltrate the liquid adhesion, such as tapes made of cotton, and can wind around the radial outside of the field winding 14, as shown in FIG. 5. Thus, when the liquid adhesive is applied outside the rotor in the manufacturing process, the adhesive applied at the axial ends of the insulator 22 can penetrate axially to the axial center of the rotor 2 and can also penetrate into the interlayer space of the field winding 14. Thus, the rotors can be manufactured reliably in the same manner as the rotors are manufactured without permanent magnets between the claw-shaped magnetic poles.

Figure 6:
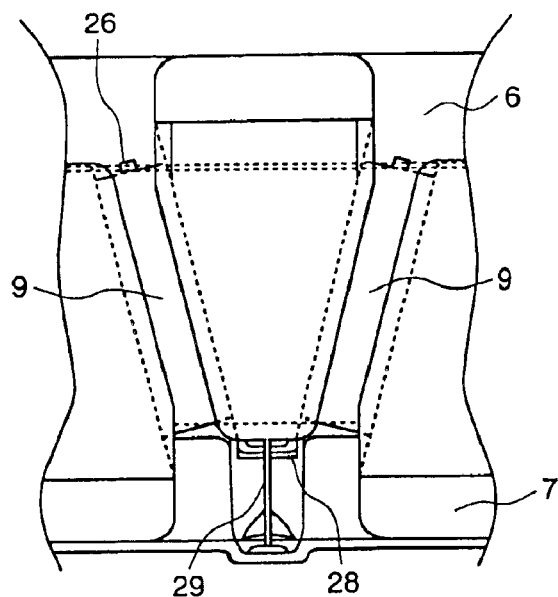
FIG. 6 shows a radial view of an example of a rotor according to the present invention.
Figure 7:
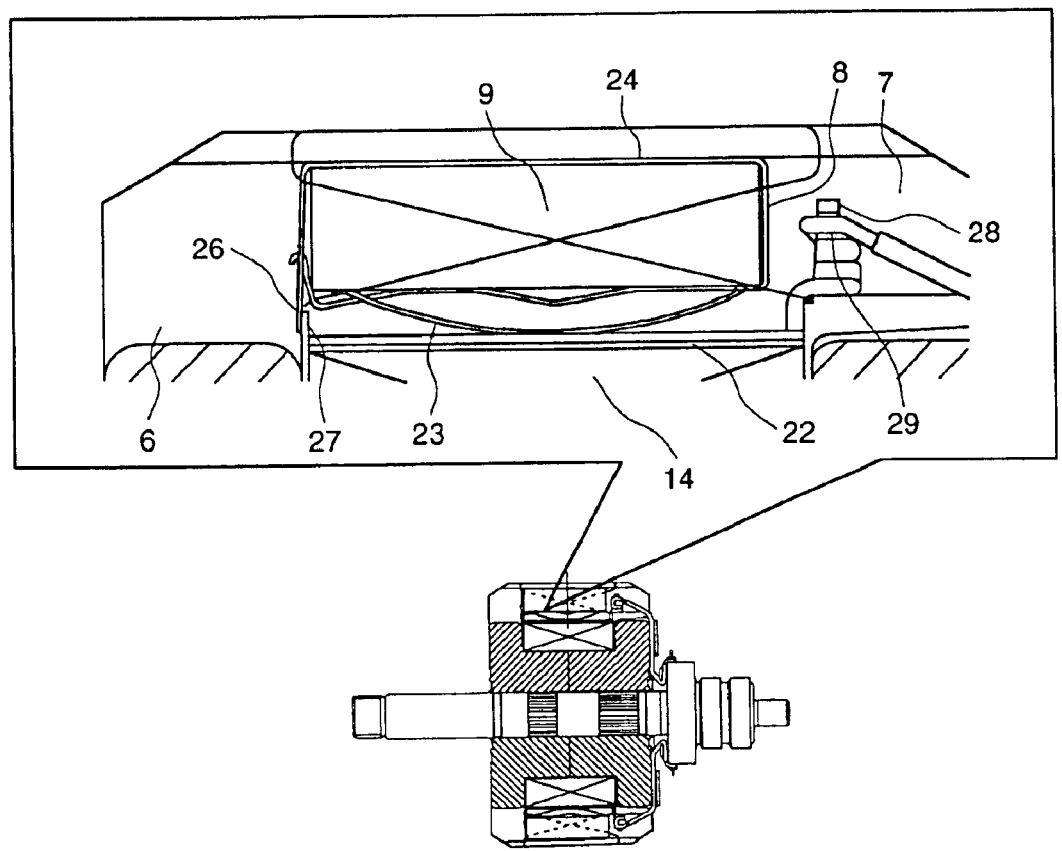
FIG. 7 shows an enlarged view of an example of a rotor according to the present invention.

As shown in FIGS. 6 and 7, the holder 8 has a protrusion 26 on its axial end face. When the permanent magnet 9 in the holder 8 is inserted between the claw-shaped magnetic poles 6, 7 of the rotor 2, the protrusion 26 can contact with the wall 27 at the axial end of the bobbin 21. Thus, the permanent magnet 9 can be located axially in the rotor 2 and the axial magnetic center of the rotor 2 can be determined. An isolating space can also be ensured between the holder 8 which is made of a conductive material and the field winding end 29 winding on the protrusion 28 which is for fastening the end of the field winding wound around the bobbin 21.

Figure 8:
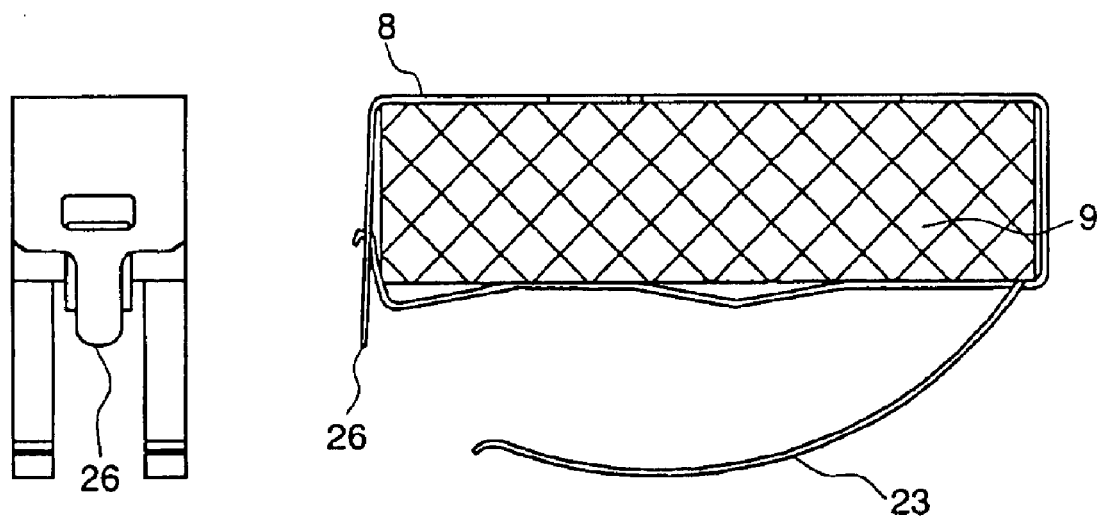
FIG. 8 shows an example of a permanent magnet 9 in a holder 8 according to the present invention, where the doubly shaded region refers to the permanent magnet.

FIG. 8 shows an example of the permanent magnet in the holder. The holder 8 encircles the permanent magnet 9 longitudinally. Thus, when the permanent magnet 9 encircled in the holder 8 is in position between the claw-shaped magnetic poles 6, 7 of the Lundell type iron core, the permanent magnet 9 can come into close contact with the magnetic poles 6, 7. The holder 8 is made of nonmagnetic materials so that the magnetic flux may not leak from between the opposed Lundell type magnetic poles.

Figure 9:
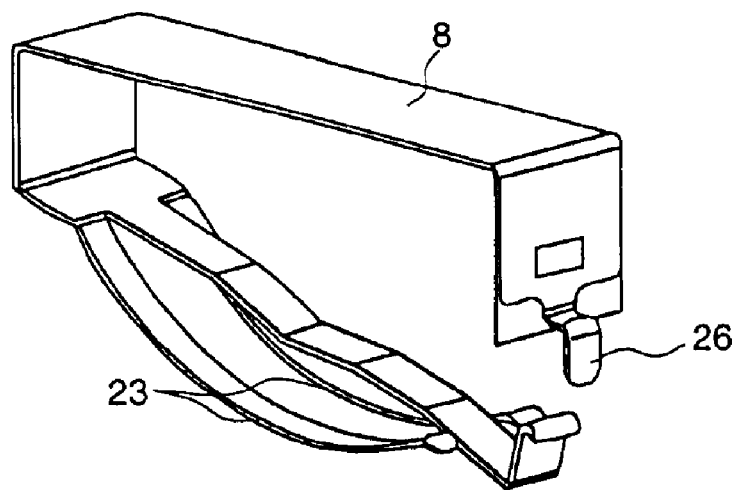
FIG. 9 shows an example of the holder 8 alone according to the present invention.

FIG. 9 shows an example of the holder alone. The holder 8 has the tongue-like piece 23 of an elastic portion on its surface which faces the field winding 14 when the holder 8 is in position. The holder 8 holds the permanent magnet 9 with a loop strip of which one longitudinal end and another end are connected. The holder 8 has at one longitudinal end face the protrusion 26 which can stop at one end of the bobbin 21.

In the above example, separate holders 8 are used for each permanent magnet 9. After assembling the field winding 14, a rotor shaft, and the claw-shaped magnetic poles, the permanent magnet 9 in the holder 8 is inserted along the rotation axis of the rotor 2. For the radial position of the permanent magnet 9, the flange protrusions 24 on the periphery of the claw-shaped magnetic poles surfaces with which the permanent magnet 9 contacts can keep the magnet 9 from jumping radially out of a predetermined position and from contacting with the stator by the centrifugal force due to the rotation of the rotor 2 applied on the holder 8 and magnet 9. The holder 8 can have the spring effect on its surface outside the field winding 14. The spring effect can push out the permanent magnet 9 in the holder 8 as outwardly as possible in the radial direction of the claw-shaped magnetic poles 6, 7 and can bring the holder 8 into contact with the internal surface of the flange protrusion 24 of the claw-shaped magnetic poles 6, 7. Thus, the spring effect can push out the permanent magnet 9 as outwardly as possible in the radial direction without contacting with the stator.

As described above, it is possible to reduce the magnetic flux loss between the claw-shaped magnetic poles 6, 7 as much as possible, which is the original object of the permanent magnet 9 between the claw-shaped magnetic poles 6, 7. It is also possible to secure the radial position of each permanent magnet 9. Therefore, a large amount of rotors with reliable performance can be produced. Additionally, the axial position of the permanent magnet 9 can be secured as follows: the permanent magnet 9 in the holder 8 is inserted between the claw-shaped magnetic poles 6, 7 until the protrusion 26 at the axial end face of the holder 8 contacts with the bobbin which can isolate the field winding 14 from the iron core and the claw-shaped magnetic poles 6, 7.

The insulator 22 outside the field winding 14 can prevent an electrical short between the field winding and the holder which is made of metal. Particularly, the insulator 22 made of materials which can easily infiltrate the adhesive for isolating and fastening the field winding 14 can resolve the manufacturing problem that the holder 8 between the claw-shaped magnetic poles 6, 7 prevent applying the adhesive around the axial center of the field winding 14.

Effects of the Invention

As described above, the present invention can provide a vehicle alternator and its rotor which can firmly fasten the permanent magnets between the claw-shaped magnetic poles in improved productivity. The present invention can also provide a vehicle alternator and its rotor having permanent magnets between the claw-shaped magnetic poles, which can reliably apply around the axial center of the permanent magnets the adhesive for isolating the field winding.

What is claimed is:

1. A rotor for a vehicle alternator comprising:
   a Lundell type iron core having claw-shaped magnetic poles which are alternately arranged and opposed each other and include a centered cylindrical field winding; and
   permanent magnets disposed between said claw-shaped magnetic poles for increasing the magnetic field,
   wherein each of said permanent magnets is respectively held by receiving elastic force of a holder effected in a radial direction of said rotor.

2. A rotor for a vehicle alternator according to claim 1, wherein said permanent magnet is encircled in said holder and pressed and held by an elastic body disposed between said holder and said field winding for exerting radial elastic force.

3. A rotor for a vehicle alternator according to claim 2, wherein said holder is integrated with said elastic body.

4. A rotor for a vehicle alternator comprising:
   a Lundell type iron core having claw-shaped magnetic poles which are alternately arranged and opposed each other and include a centered cylindrical field winding, and
   a permanent magnet disposed between said claw-shaped magnetic poles for increasing the magnetic field,
   wherein said permanent magnet is held by radial elastic force,
   wherein said permanent magnet is encircled in a holder and pressed and held by an elastic body disposed between said holder and said field winding for exerting radial elastic force,
   wherein said holder is integrated with said elastic body, and
   wherein said holder is made of a metal strip and said elastic body is in contact with said field winding via an insulating member.

5. A rotor for a vehicle alternator comprising:
   a Lundell type iron core having claw-shaped magnetic poles which are alternately arranged and opposed each other and include a centered cylindrical field winding, and
   a permanent magnet disposed between said claw-shaped magnetic poles for increasing the magnetic field,
   wherein said permanent magnet is held by radial elastic force,
   wherein said permanent magnet is encircled in a holder and pressed and held by an elastic body disposed between said holder and said field winding for exerting radial elastic force, and
   wherein said holder encircles said permanent magnet longitudinally and has a tongue-like piece of an elastic portion on its surface facing said field winding.

6. A rotor for a vehicle alternator according to claim 5, wherein said tongue-like piece is a cutout of said holder and has an arc shape being convex toward said field winding.

7. A rotor for a vehicle alternator comprising:
   a Lundell type iron core having claw-shaped magnetic poles which are alternately arranged and opposed each other and include a centered cylindrical field winding, and
   a permanent magnet disposed between said claw-shaped magnetic poles for increasing the magnetic field,
   wherein said permanent magnet is held by radial elastic force,
   wherein said permanent magnet is encircled in a holder and pressed and held by an elastic body disposed between said holder and said field winding for exerting radial elastic force,
   wherein said holder is integrated with said elastic body, and
   wherein said holder includes a loop strip which encircles said permanent magnet longitudinally, the starting end at one longitudinal end of the strip having a protrusion extending beyond the permanent magnet width, the finishing end of the strip connecting to the starting end, and said protrusion stopping at one end of a field winding bobbin.

8. A rotor for a vehicle alternator according to claim 5, wherein said elastic portion is in contact with an insulating material wound on said field winding.

9. A rotor for a vehicle alternator according to claim 8, wherein said insulating material wound on said field winding is a fabric suitable for dropped adhesives.

10. A vehicle alternator comprising:
    a stator, and
    a rotor rotatively disposed opposing said stator with a gap therebetween including
    a Lundell type iron core having claw-shaped magnetic poles which are alternately arranged and opposed each other and include a centered cylindrical field winding, and
    permanent magnets disposed between said claw-shaped magnetic poles for increasing the magnetic field,
    wherein each of said permanent magnets is respectively held by receiving elastic force of a holder effected in a radial direction of said rotor.

11. A vehicle alternator according to claim 10, wherein said permanent magnet is encircled in said holder and pressed and held by an elastic body disposed between said holder and said field winding for exerting radial elastic force.

12. A vehicle alternator according to claim 11, wherein said holder is integrated with said elastic body.

13. A vehicle alternator comprising:

a stator, and a rotor rotatively disposed opposing said stator with a gap therebetween including a Lundell type iron core having claw-shaped magnetic poles which are alternately arranged and opposed each other and include a centered cylindrical field winding, and a permanent magnet disposed between said claw-shaped magnetic poles for increasing the magnetic field, wherein said permanent magnet is held by radial elastic force, wherein said permanent magnet is encircled in a holder and pressed and held by an elastic body disposed between said holder and said field winding for exerting radial elastic force.

wherein said holder is integrated with said elastic body, and wherein said holder is made of a metal strip and said elastic body is in contact with said field winding via an insulating member.

14. A vehicle alternator comprising:

a stator, and a rotor rotatively disposed opposing said stator with a gap therebetween including a Lundell type iron core having claw-shaped magnetic poles which are alternately arranged and opposed each other and include a centered cylindrical field winding, and a permanent magnet disposed between said claw-shaped magnetic poles for increasing the magnetic field, wherein said permanent magnet is held by radial elastic force, wherein said permanent magnet is encircled in a holder and pressed and held by an elastic body disposed between said holder and said field winding for exerting radial elastic force, and wherein said holder encircles said permanent magnet longitudinally and has a tongue-like piece of an elastic portion on its surface facing said field winding.

15. A vehicle alternator according to claim 14, wherein said tongue-like piece is a cutout of said holder and has an arc shape being convex toward said field winding.

16. A vehicle alternator comprising:

a stator, and a rotor rotatively disposed opposing said stator with a gap therebetween including a Lundell type iron core having claw-shaped magnetic poles which are alternately arranged and opposed each other and include a centered cylindrical field winding, and a permanent magnet disposed between said claw-shaped magnetic poles for increasing the magnetic field, wherein said permanent magnet is held by radial elastic force, wherein said permanent magnet is encircled in a holder and pressed and held by an elastic body disposed between said holder and said field winding for exerting radial elastic force, wherein said holder is integrated with said elastic body, and wherein said holder includes a loop strip which encircles said permanent magnet longitudinally, the starting end at one longitudinal end of the strip having a protrusion extending beyond the permanent magnet width, the finishing end of the strip connecting to the starting end, and said protrusion stopping at one end of a field winding bobbin.

17. A vehicle alternator according to claim 14, wherein said elastic portion is in contact with an insulating material wound on said field winding.

18. A vehicle alternator according to claim 17, wherein said insulating material wound on said field winding is a fabric suitable for dropped adhesives.

* * * * *